United States Patent
Gonzalez

(10) Patent No.: US 10,630,104 B2
(45) Date of Patent: Apr. 21, 2020

(54) AUTOMATIC CURRENT BALANCING FOR POWER SYSTEMS

(71) Applicant: SCHNEIDER ELECTRIC IT CORPORATION, West Kingston, RI (US)

(72) Inventor: Daniel Gonzalez, Domène (FR)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 103 days.

(21) Appl. No.: 15/486,399

(22) Filed: Apr. 13, 2017

(65) Prior Publication Data

US 2018/0301930 A1    Oct. 18, 2018

(51) Int. Cl.
| | |
|---|---|
| *H02J 9/06* | (2006.01) |
| *H02J 3/46* | (2006.01) |
| *H02J 7/00* | (2006.01) |
| *H02M 3/04* | (2006.01) |
| *H02M 7/04* | (2006.01) |
| *H02M 7/44* | (2006.01) |

(52) U.S. Cl.
CPC .............. *H02J 9/061* (2013.01); *H02J 3/46* (2013.01); *H02J 7/007* (2013.01); *H02J 9/062* (2013.01); *H02M 3/04* (2013.01); *H02M 7/04* (2013.01); *H02M 7/44* (2013.01); *H02J 2009/068* (2013.01)

(58) Field of Classification Search
CPC ...................................... H02J 9/06; H02J 3/46
USPC ................ 307/43, 51–53, 64–66, 85–86
See application file for complete search history.

(56) References Cited

U.S. PATENT DOCUMENTS

| | | | |
|---|---|---|---|
| 8,410,638 B2 | 4/2013 | Johnson, Jr. | |
| 9,831,675 B2* | 11/2017 | Colombi | H02J 3/38 |
| 10,003,189 B2* | 6/2018 | Ouyang | G05F 1/59 |
| 10,340,732 B2 | 9/2019 | Tassitino et al. | |
| 2005/0288826 A1 | 12/2005 | Tassitino et al. | |

(Continued)

FOREIGN PATENT DOCUMENTS

| | | |
|---|---|---|
| CN | 1043998 A | 7/1990 |
| DE | 102011005050 A1 | 10/2011 |
| WO | 2014193385 A2 | 12/2014 |

OTHER PUBLICATIONS

Extended European Search Report from corresponding European Application No. 18166195.0 dated Aug. 24, 2018.

*Primary Examiner* — Adi Amrany
(74) *Attorney, Agent, or Firm* — Lando & Anastasi, LLP

(57) ABSTRACT

According to aspects, embodiments herein provide a power system comprising a first Uninterruptible Power Supply (UPS) configured to operate in parallel with a plurality of UPSs, the first UPS including an input configured to receive input power, an output configured to provide output power to a load, a bypass circuit interposed between the input and output and including a bypass switch, the bypass switch positioned to couple the input and the output in a bypass mode and decouple the input and the output in an on-line mode, and a controller coupled to the first UPS and configured to monitor an input current through the bypass circuit, and control the bypass switch of the first UPS to interrupt the input current through the bypass circuit of the first UPS for a delay during the bypass mode such that each UPS provides a balanced output current to the load.

18 Claims, 8 Drawing Sheets

(56) References Cited

U.S. PATENT DOCUMENTS

| | | |
|---|---|---|
| 2006/0221523 A1 | 10/2006 | Colombi et al. |
| 2011/0278934 A1 | 11/2011 | Ghosh et al. |
| 2012/0181871 A1 | 7/2012 | Johansen et al. |
| 2013/0193759 A1 | 8/2013 | Giuntini |
| 2013/0193760 A1 | 8/2013 | Colombi et al. |
| 2013/0193761 A1 | 8/2013 | Colombi et al. |
| 2015/0061392 A1 | 3/2015 | Berard |
| 2015/0263566 A1 | 9/2015 | Kolhatkar et al. |
| 2016/0308389 A1 | 10/2016 | Bush et al. |
| 2017/0163086 A1 | 6/2017 | Bach |
| 2017/0250604 A1* | 8/2017 | Ouyang .................... G05F 1/59 |
| 2019/0157903 A1* | 5/2019 | Umezawa ............... H02M 7/08 |

* cited by examiner

AUTOMATIC CURRENT BALANCING FOR POWER SYSTEMS

BACKGROUND OF THE INVENTION

Field of the Invention

At least one example in accordance with the present invention relates generally to Uninterruptible Power Supply (UPS) systems.

Discussion of Related Art

The use of power devices, such as uninterruptible power supplies (UPS), to provide regulated, uninterrupted power for sensitive and/or critical loads, such as computer systems and other data processing systems, is known. Known uninterruptible power supplies include on-line UPSs, off-line UPSs, line interactive UPSs, as well as others. On-line UPSs provide conditioned AC power as well as back-up AC power upon interruption of a primary source of AC power. Off-line UPSs typically do not provide conditioning of input AC power, but do provide back-up AC power upon interruption of the primary AC power source. Line interactive UPSs are similar to off-line UPSs in that they switch to battery power when a blackout occurs but also typically include a multi-tap transformer for regulating the output voltage provided by the UPS.

A typical on-line UPS rectifies input power provided by an electric utility using a Power Factor Correction circuit (PFC) to provide rectified power to a DC bus. The rectified DC voltage is typically used to charge a battery while mains power is available, as well as to provide power to the DC bus. In the absence of mains power, the battery provides power to the DC bus. From the DC bus, an inverter generates an AC output voltage, which is provided to the load. Since the DC bus may be powered by either the mains or the battery, the output power of the UPS is uninterrupted if the battery is sufficiently charged when the mains fails. Typical on-line UPSs may also operate in a bypass mode in which unconditioned power is provided directly from an AC power source through the bypass line to the load.

To provide enhanced scalability and/or redundancy, two or more UPSs may be electrically connected to form a parallel UPS system. In such a system, the combination of multiple UPSs may provide increased power capacity to a load attached to the parallel UPS system. Also, if one of the UPSs coupled in parallel fails, the other UPSs coupled in parallel may act as backup supplies for the failed UPS.

SUMMARY

Aspects and embodiments are generally directed to systems and methods for automatically balancing load sharing between each of a plurality of parallel UPSs during a bypass mode of operation. Aspects and embodiments discussed herein include one or more active components within a bypass circuit of each UPS which may be dynamically controlled to automatically interrupt an input current such that an output current of each UPS of the plurality provides a substantially equivalent Root Mean Square (RMS) current. Accordingly, aspects and embodiments provide a reduced size, weight, cost, and complexity load sharing system when compared to various known approaches for load balancing.

According to an aspect, provided is a power system. In one example, the power system comprises a first Uninterruptible Power Supply (UPS) configured to operate in parallel with a plurality of UPSs, the first UPS including an input coupled to a power source and configured to receive input power from the power source, an output coupled to a load and configured to provide output power to the load based at least in part on the input power, a first bypass circuit interposed between the input and the output and including at least a first bypass switch, the at least a first bypass switch being positioned to couple the input and the output in a bypass mode of operation and decouple the input and the output in an on-line mode of operation, and a controller coupled to at least the first UPS and configured to monitor an input current through the first bypass circuit of the first UPS during the bypass mode of operation, and control the at least a first bypass switch of the first UPS to interrupt the input current through the first bypass circuit of the first UPS for the duration of a first delay during the bypass mode of operation such that each UPS of the plurality of UPSs provides a substantially balanced output current, among the plurality of UPSs, to the load.

In one embodiment, in controlling the at least a first bypass switch of the first UPS to interrupt the input current through the first bypass circuit the controller is further configured to reduce the input current such that each UPS of the plurality provides a substantially equivalent Root Mean Square (RMS) current to the load. According to an embodiment, the power system further comprises the plurality of UPSs, and each UPS of the plurality includes a second bypass circuit including at least a second bypass switch, and the controller is further coupled to each UPS of the plurality of UPSs and configured to control the at least a second bypass switch of each UPS of the plurality during the duration of the first delay such that an output current waveform of each UPS of the plurality is continuous.

According to an embodiment, the controller is further configured to identify a second UPS of the plurality of UPSs based on a determination of which output current has the largest magnitude, and control the at least a second bypass switch of the second UPS to interrupt the current through the second bypass circuit of the second UPS for the duration of a second delay such that each of the other UPSs of the plurality maintains the substantially equivalent RMS current provided to the load. In one embodiment, the controller is further configured to control the at least a first bypass switch of the first UPS and the at least a second bypass switch of the second UPS such that the duration of the first delay and the duration of the second delay are non-concurrent. According to one embodiment, in controlling the at least a first bypass switch of the first UPS to interrupt the input current through the bypass circuit of the first UPS the controller is further configured to interrupt the input current through the at least a first bypass circuit of the first UPS for a duration of up to at least a full cycle of a waveform of the input current.

In an embodiment, the controller is further configured to dynamically adjust the duration of the first delay based at least in part on a value of the input current through the first bypass circuit of the first UPS. According to an embodiment, the at least a first bypass switch of the first UPS is a set of Silicon Controlled Rectifiers (SCRs). According to an embodiment, the input power includes single-phase electrical input power, and in controlling the at least a first bypass switch of the first UPS to interrupt the input current through the first bypass circuit of the first UPS the controller is configured to provide a single control signal to the SCRs of the first UPS.

According to an embodiment, the input power includes three-phase electrical input power and the at least a first bypass switch of the first UPS includes a plurality of sets of SCRs, each set of SCRs of the plurality corresponding to a phase of the three-phase electrical input power. In one embodiment, in controlling the at least a first bypass switch of the first UPS to interrupt the input current through the first bypass circuit of the first UPS the controller is configured to provide a single control signal to each set of SCRs of the first UPS.

In one embodiment, the first UPS further includes an AC/DC converter coupled to the input and configured to convert the input power into DC power during the on-line mode of operation, a DC/AC converter coupled to the output and configured to convert the DC power into the output power, and a DC bus interposed between the AC/DC converter and the DC/AC converter, and responsive to a determination that the input power is above or below a predetermined level the controller is further configured to control the at least a first bypass switch of the first UPS to operate in the on-line mode of operation.

According to an aspect, provided is a method for operating a power system including a plurality of Uninterruptible Power Supplies (UPS) coupled in parallel, the method comprising receiving input power from a power source at an input of each UPS of the plurality, monitoring an input current through a bypass circuit of each UPS of the plurality during a bypass mode of operation, each bypass circuit including at least one bypass switch positioned to couple the input with an output of each UPS during the bypass mode of operation, and controlling the at least one bypass switch of a first UPS of the plurality of UPSs to interrupt the input current through the bypass circuit of the first UPS for the duration of a first delay during the bypass mode of operation such that each UPS of the plurality provides a substantially balanced output current, among the plurality UPSs, to the load.

In one embodiment, controlling the at least one bypass switch of the first UPS of the plurality to interrupt the input current through the bypass circuit of the first UPS includes reducing the input current through the first bypass circuit of the first UPS such that each UPS of the plurality provides a substantially equivalent Root Mean Square (RMS) current to the load. In one embodiment, the method further comprises controlling the at least one bypass switch of each of the other UPS of the plurality of UPSs during the duration of the first delay such that an output current waveform of each of the each other UPSs is continuous.

In an embodiment, the method further comprises identifying a second UPS of the plurality of UPSs based on a determination of which input current has the largest magnitude, and controlling the at least one bypass switch of the second UPS to interrupt the input current through the bypass circuit of the second UPS for the duration of a second delay during the bypass mode of operation such that each UPS of the plurality maintains the substantially equivalent RMS current provided to the load. According to an embodiment, controlling the at least one bypass switch of the first UPS to interrupt the input current through the bypass circuit of the first UPS further includes interrupting the input current through the bypass circuit of the first UPS for a duration of up to at least a full cycle of a waveform of the input current.

According to an embodiment, the input power includes single-phase electrical input power and controlling the at least one bypass switch of the first UPS to interrupt the input current through the bypass circuit of the first UPS includes providing a single control signal to a set of Silicon Controlled Rectifiers (SCRs) of the first UPS. In one embodiment, the input power includes three-phase electrical input power and controlling the at least one bypass switch of the first UPS to interrupt the input current through the bypass circuit of the first UPS includes providing a single control signal to a plurality of sets of Silicon Controlled Rectifiers (SCRs) of the first UPS, each set of SCRs of the plurality corresponding to a phase of the three-phase electrical input power.

According to an aspect, provided is a power system. In one example, the power system comprises a plurality of Uninterruptible Power Supplies (UPS), each UPS of the plurality of UPSs coupled in parallel and including an input coupled to a power source and configured to receive input power from the power source, an output coupled to a load and configured to provide output power to the load based at least in part on the input power, a bypass circuit interposed between the input and the output and including at least one bypass switch, the at least one bypass switch being positioned to couple the input and the output in a bypass mode of operation and decouple the input and the output in an on-line mode of operation, and means for controlling a first UPS of the plurality to interrupt an input current through the bypass circuit of the first UPS for the duration of a first delay during the bypass mode of operation such that each UPS of the plurality provides a substantially balanced output current, among the plurality of UPSs, to the load.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment in any manner consistent with at least one of the objectives, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION OF THE INVENTION

Figure 1A:
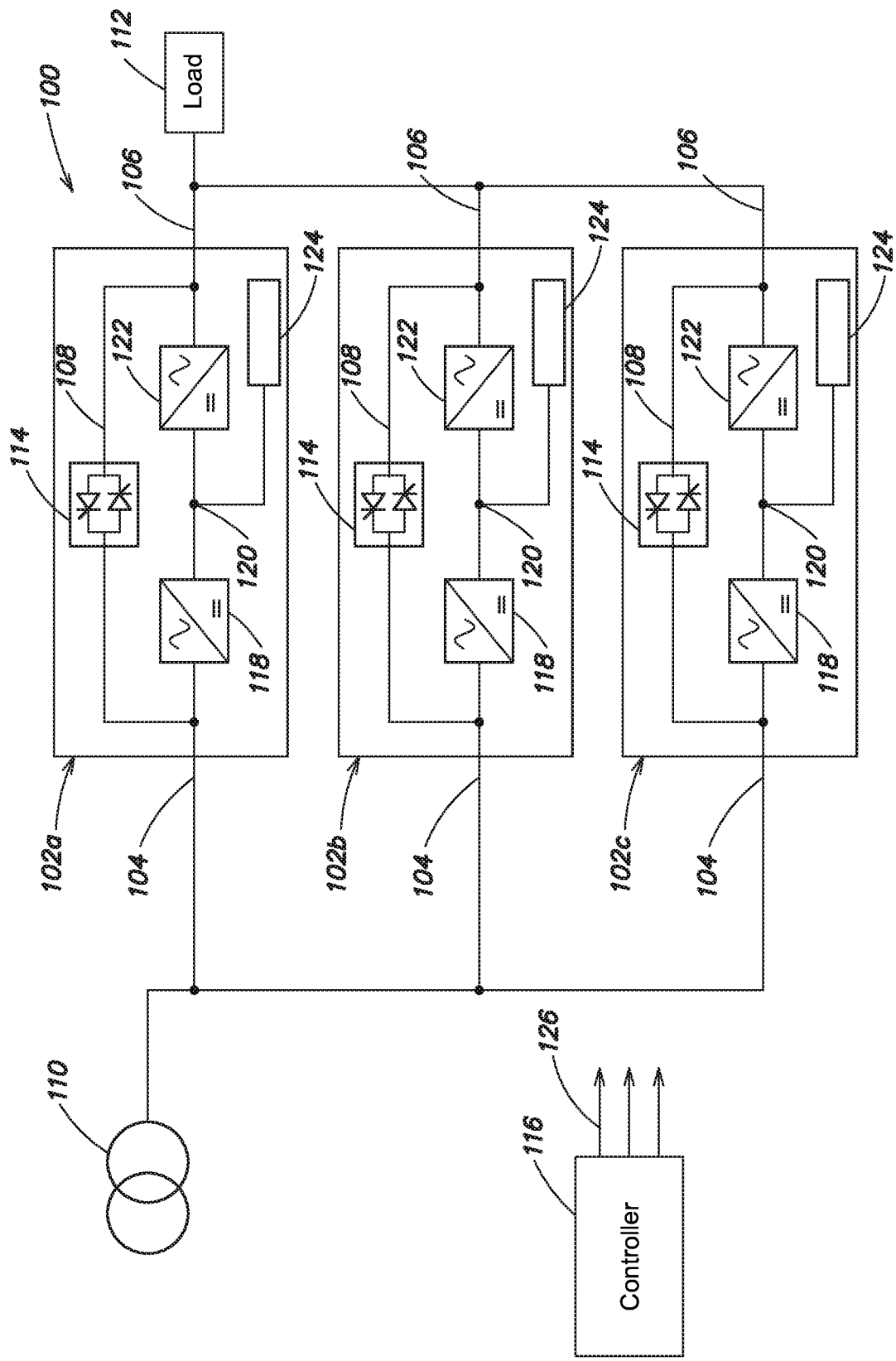
FIG. 1A is a block diagram of an example power system including a plurality of parallel UPSs, according to aspects of the invention.

Aspects and embodiments are generally directed to systems and methods for automatically balancing load sharing between each of a plurality of parallel UPSs during a bypass mode of operation.

As discussed above, typical on-line UPSs may operate in a bypass mode or an on-line mode of operation. During the bypass mode, unconditioned power is provided directly from an AC power source (e.g., AC mains) through a bypass line (e.g., a bypass circuit) to a load. In the event of a disturbance at the AC mains, such as a sag or swell condition, the on-line UPS may enter the on-line mode, or battery mode, during which the bypass line is disconnected from the load by opening a bypass switch. During the on-line mode, the UPS is operated to condition power provided by the AC mains, or battery, and provide the conditioned power to an output coupled to the load.

As also discussed above, two or more UPSs may be electrically connected to form a parallel UPS system with a single output. In a parallel UPS system, successful (i.e., equal) load sharing between the on-line UPSs is achieved by operating the inverter of each on-line UPS during the on-line mode to properly regulate the power provided by each on-line UPS to the single output (coupled to the load).

Successful load sharing between on-line UPSs coupled in parallel is much more difficult to achieve in the bypass mode where unconditioned power is provided by each UPS to the single output. More specifically, even if similarly rated on-line UPSs are coupled together in parallel, and are each providing power to the output (i.e., the load), in bypass mode, manufacturing differences in components within each UPS may result in unequal load sharing between each UPS. Moreover, differences in the cables that couple each UPS to the power source and the single output may also significantly contribute to unbalanced load sharing.

If a load is unevenly shared between on-line UPSs coupled in parallel (and operating in bypass mode), one of the UPSs may become overloaded. For example, the uneven sharing of a load between on-line UPSs coupled in parallel may result in a protection circuit tripping (e.g., a breaker either upstream or internal to the on-line UPS), or a bypass switch opening, resulting in its share of the load being transferred to the other UPSs coupled in parallel. The additional load transferred to the other UPSs may result in the tripping of an additional protection circuit in another of the UPSs, and the transferring of its load to the other UPSs. As this breaker protection tripping/load transfer process continues, the remaining UPSs may eventually be unable to support the load, and the load may be dropped.

One typical technique for dealing with uneven load sharing between parallel UPSs operating in bypass mode is to identify the actual portion of the load supported by each UPS (i.e., the load sharing portion), and to adjust the impedance between each UPS and the load in an attempt to evenly distribute the load across the UPSs. The impedance between each UPS and the load may be managed by adjusting the length of the cable coupling each UPS to the load and/or adding a choke (i.e., an inductor) between a respective UPS and the load. However, such techniques are typically difficult to implement, require additional space for added cable length, increase the losses of the system (e.g., as a result of the additional cable length), and can be expensive to implement.

For example, it is generally accepted that despite adjusting the lengths of and/or adding chokes to the cables coupling parallel UPSs to a load, a maximum number of four on-line UPSs operating in bypass mode can be coupled together in parallel. Coupling more than four on-line UPSs together in parallel may result in a load sharing portion deviation of more than 10% between the UPSs. Even with four parallel on-line UPSs operating in bypass mode, up to 10% deviation in the load sharing portion of each UPS can occur.

Accordingly, various aspects and embodiments provide a system for automatic load sharing across multiple UPSs coupled in parallel during a bypass mode of operation. In addition to the other advantages discussed herein, various aspects and embodiments of the described system may reduce the amount of cable length and additional components (e.g., chokes) required to properly balance load sharing between multiple parallel UPSs. As such, various aspects and embodiments may provide a system having a reduced size, weight, cost, and complexity when compared to various known load balancing systems.

Examples of the systems and methods discussed herein are not limited in application to the details of construction and the arrangement of components set forth in the following description or illustrated in the accompanying drawings. The systems and methods are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

FIG. 1A is a block diagram of an example power system 100 including a plurality of on-line UPSs, according to certain aspects and embodiments. As illustrated, each of the UPSs may be coupled in parallel, such as the three illustrated UPSs 102a, 102b, 102c. Each UPS 102a-c may include an input 104, an output 106, and a bypass circuit 108. The input 104 of each UPS 102a-c may be coupled to a power source 110 and configured to receive input power (e.g., AC power) therefrom. Similarly, the output 106 of each UPS 102a-c may be coupled to a shared load 112 and configured to provide output power to the load 112 based at least in part on the input power. The bypass circuit 108 (e.g., bypass line) of each UPS is interposed between the input 104 and the output 106 and may include at least one bypass switch 114. As further discussed herein, control of the bypass switch 114 of a given UPS 102a-c may operate that UPS in one of a bypass mode of operation and an on-line mode of operation. In certain examples, the system 100 may include a controller 116 coupled to each UPS 102a-c. The controller 116 may manage the operation of the respective bypass switch 114, as illustrated in FIG. 1A. However, in certain other examples a dedicated controller may be integrated within each UPS 102a-c. That is, a single controller 116 is shown in FIG. 1A for the convenience of illustration only. As further illustrated in FIG. 1A, each UPS 102a-c may further include an AC/DC converter 118, a DC bus 120, and a DC/AC converter 122.

For each UPS 102a-c, the AC/DC converter 118 is interposed between the DC bus 120 and the input 104 and the DC/AC converter 122 is interposed between the DC bus 120 and the output 106. Each UPS 102a-c is coupled in parallel so that the input 104 of each UPS 102a-c is coupled to the power source 110 and the output 106 of each UPS 102a-c is coupled to the load 112. While the example of FIG. 1A illustrates three UPSs 102a-c coupled in parallel for the convenience of illustration, given the benefit of this disclosure one skilled in the art would appreciate that the system 100 may include any suitable number of UPSs coupled in parallel. For example, as a result of the improved functionality of the system 100, the system 100 may include more than four UPSs coupled in parallel.

In certain examples, the controller 116 is coupled to each UPS 102a-c and configured to monitor the input power provided by the power source 110 to each UPS 102a-c. Based on the quality of the input power and/or the absence of the input power, the controller 116 is configured to control each of the UPSs 102a-c between various modes of operation, such as a "bypass" mode of operation, an "on-line" mode of operation, and/or a "battery" mode of operation.

In response to determining that the input power provided by the power source 110 is either lower than or greater than a desired level (e.g., is in a sag or swell condition), the controller 116 controls each UPS 102a-c to enter the on-line mode of operation. During the on-line mode of operation, the controller 116 operates a backfeed relay in each UPS 102a-c to close (thereby coupling the power source 110 to the input 104), and operates the bypass switch 114 of each UPS 102a-c to open. Accordingly, the AC/DC converter 118 of each UPS 102a-c receives AC power from the power source 110 and converts the received AC power into DC power to provide the DC power to the DC bus 120. According to various examples, the DC/AC converter 122 of each UPS 102a-c may receive the DC power from the DC bus 120 and may convert the received DC power into AC power to be provided to the output 106.

In certain examples, during the on-line mode of operation the DC power on the DC bus 120 of each UPS 102a-c may be provided to a DC/DC converter 124 coupled to the DC bus 120. The DC/DC converter 124 converts the DC power received from the DC bus 120 into DC power at a desired charging level. In such an example, the DC power at the desired charging level may be provided to a corresponding battery to charge the battery.

In response to a determination that the AC power provided by the power source 110 has failed (e.g., is in a brownout or blackout condition), the controller 116 operates each UPS 102a-c to enter the battery mode of operation. During the battery mode of operation, the controller 116 operates a backfeed relay in each UPS 102a-c to open (thereby decoupling the power source 110 from the input 104). Similarly, the controller 116 operates the bypass switch 108 of each UPS 102a-c to open. DC power from the battery is then provided to the DC bus 120. The DC/AC converter 122 may receive the DC power from the DC bus 120 and convert the received DC power into AC power, which is provided to the output 106.

In response to a determination that the AC power provided by the power source 110 is at a desired level, the controller 116 may operate each UPS 102a-c to enter the bypass mode of operation. During the bypass mode of operation each UPS 102a-c may provide unconditioned power directly from the power source 110 (e.g., AC mains) through bypass circuit 108 to the load 112. That is, each bypass circuit 108 receives an input current from the input 104 and provides an output current derived from the input current to the output 106. In certain embodiments, during the bypass mode of operation the controller 116 controls the backfeed relay in each UPS 102a-c to close (thereby coupling the power source 110 to the input 104), and controls the bypass switch 114 of each UPS 102a-c to close. Accordingly, in the bypass mode of operation, the input 104 of each UPS 102a-c is coupled directly to the output 106 of the corresponding UPS 102a-c via the bypass circuit 108.

In certain embodiments, the controller 116 is coupled to the input 116 of each UPS 102a-c and configured to determine whether each UPS 102a-c should be in the bypass mode of operation. For instance, the controller 116 may monitor the input current to determine the presence, quality, and/or level of the input power. In particular examples, the controller 116 determines whether the input power is above or below a predetermined level (e.g., in a sag or swell condition) to determine if each UPS 102a-c should be in the bypass mode of operation. Responsive to determining that the UPSs 102a-c should be in the bypass mode of operation, the controller 116 operates the bypass switch 114 of each UPS 102a-c to close. When in the closed position, each bypass switch 114 couples the respective input 104 directly to the respective output 106 of each UPS 102a-c. In several embodiments, each bypass switch 114 is controlled by an analog or digital control signal (e.g., signals 126) received from the controller 116. In particular examples, each bypass switch 114 is a set of Silicon Controlled Rectifiers (SCR), such as a set of thyristors. However, in certain other examples each bypass switch 114 may be another suitable type of switch, such as a transistor-based switch.

In various embodiments, the controller 116 is configured to monitor the input current through the bypass circuit 108 of each UPS 102a-c during the bypass mode of operation. Based on the monitored input current, the controller 116 is configured to identify a first UPS of the UPSs 102a-c based on a determination of which current has the largest magnitude. For example, the controller 116 may determine which UPS 102a-c has the largest input current by comparing the current through the bypass circuit 108 of each UPS 102a-c with the current through the bypass circuit 108 of each other UPS 102a-c. In certain other examples, the controller 116 may identify which UPS 102a-c has the largest input current by comparing the current through each bypass circuit 108 with an average of the input currents. However, in still other examples, the controller 116 may use any other suitable process to identify the UPS with the largest input current magnitude.

Responsive to identifying the first UPS, the controller 116 provides a control signal to the bypass switch 114 of the first UPS to control the bypass switch 114 to interrupt the input current through the respective bypass circuit 108 for a duration of a first delay. In particular, the controller 116 operates the first bypass switch 114 to interrupt the input current such that each of the UPSs 102a-c provides a substantially balanced output current, among the UPSs 102a-c, to the load 112 (e.g., via the corresponding output 106). That is, the controller 116 is configured to operate the bypass switch 114 of the first UPS such that the power provided to the load 112 is evenly distributed among each of the UPSs 102a-c. Also during the duration of the first delay, the controller 116 provides a control signal to each of the other UPSs (i.e., all of the UPSs excluding the first UPS) to maintain the respective bypass switch 114 in a closed position such that an output current waveform of each of the other UPSs is continuous during the duration of the first delay. That is, even though an interruption is introduced in the output current of the first UPS, the load 112 receives a full sinusoidal waveform (e.g., for a linear load) from each of the other UPSs during the duration of the first delay.

In certain embodiments, the controller 116 is configured to interrupt the input current through the bypass circuit 108 of the first UPS by reducing the input current through the bypass circuit 108. For example, the controller 116 may operate the bypass switch 114 of the first UPS to open for the duration of the first delay and control the bypass switch 114 to close at the conclusion of the first delay. In certain examples, the controller 116 may track a waveform of the input current and operate the bypass switch 114 of the first UPS to open at about a zero-crossing of the waveform. Accordingly, the first delay may begin at about the zero-crossing of the input current waveform.

As discussed above, in certain examples each bypass switch 114 may include an SCR, and in particular, a set of SCRs. For example, each bypass switch 114 may include a pair of SCRs per phase of the input current. A first SCR of the pair may be controlled to operate during a positive portion of the input current waveform, and a second SCR of the pair (e.g., arranged in a substantially opposite orientation to the first SCR) may be controlled to operate during a negative portion of the input current waveform. In such an example, the controller 116 may provide a control signal to the set of SCRs to close, which permits propagation of the input current between the input 104 and the output 106. To begin the interruption of the input current, the controller 116 may remove the control signal from the corresponding set of SCRs. Once the signal is removed, each SCR will open as the input current waveform reaches a zero crossing and interrupt the input current. In certain examples, the controller 116 may manage operation of the power system 100 such that the current through only one of the UPSs 102a-c is interrupted at any given time. Such an example provides the benefit of increased safety and avoidance of load interruptions.

In certain examples, during the duration of the first delay, each of the other UPSs will experience an increase in the instantaneous input current. In particular, the increase will be relative to the reduction of the input current through the bypass circuit 108 of the first UPS. Accordingly, the controller 116 may automatically adjust the duration of the first delay period such that each UPS 102a-c of the plurality provides a substantially equivalent Root Mean Square (RMS) current to the load 112 (e.g., via the corresponding output 106). In some implementations, the controller 116 may interrupt the input current through the bypass circuit 108 of the first UPS for a duration of up to at least a full cycle of the input current waveform, which in some instances may include interrupting the input current for up to several (e.g., two or three) cycles of the input current waveform. However, in certain other instances, the interruption may be less than a full cycle of the waveform.

By dynamically adjusting the duration of the first delay period, the RMS current of each UPS 102a-c can be controlled to a substantially equivalent RMS value (e.g., about the same RMS current value), despite differences in components and cabling. In particular examples, the controller 116 may dynamically adjust the duration of the first delay based at least in part on the monitored input current of each of the UPSs 102a-c.

For example, when determining the timing and duration of one or more delays, the controller 116 may first identify the cardinality of active UPSs within the power system 100. Once identified, the controller 116 may define a controlled time period based on a targeted tolerance of the load. Specifically, the targeted tolerance may be based on a percentage variation in the input current. Once the controlled time period has been calculated, the controller 116 may assign a priority to each identified UPS within the power system 100. For example, the controller 116 may assign a first priority to the first UPS 102a, a second priority to the second UPS 102b, and a third priority to the third UPS 102c. Interruption of the input current through one of the UPSs 102a-c is managed by the controller 116 according to the order of priorities to maintain the targeted tolerance during the controlled time period. At the conclusion of a first delay, the controller 116 may reassign the priorities or maintain the previous order of priorities. This order of operations may automatically continue until each identified active UPS within the system 100 provides a substantially balanced output current to the load across the active UPSs. In certain examples the controller 116 may assign priorities based on which UPS has an output current with the largest magnitude.

While in certain examples, the controller 116 may apply these operations for single-phase input power, in certain other examples, the controller 116 may also apply these operations for each phase of three-phase input power. For instance, when receiving three-phase power, the controller 116 may select and interrupt the phase with the largest magnitude, as discussed above. The controller 116 may then apply similar operations to the remaining two phases.

In certain examples, the duration of a given delay may be based on a relationship between a ratio of the input current of a UPS 102a-c and an average output current of the system 100, and a duration of the controlled time period. For example, in response to determining that the input current of the first UPS 102a exceeds an average output current by 10%, the controller 116 may operate the corresponding bypass switch 114 of the first UPS 102a to interrupt the input current through the first UPS 102*a* for a duration of about 10% of the controlled time period. While control in such a manner illustrates one example, the controller 116 may perform certain other operations for calculating a suitable delay in other embodiments. In particular, in certain examples the controller 116 may adjust delays based on one or more regulatory requirements. As further discussed herein, such operations may be performed by the controller 116 continuously and/or dynamically during the operation of the system 100. Such functionality offers the benefit of offering data which accurately reflects the thermal constraints applied to the power system 100.

While in certain examples, such as those described above, the controller 116 may operate each bypass switch 114 based on an order of assigned priorities, it certain other embodiments, an order of interruptions may be based on a random determination. That is, the order in which the input current through each UPS 102*a-c* is interrupted may be random so long as each interruption is performed at an appropriate speed and for an appropriate duration. For example, the order of interruptions may be random so long as the duration of a thermal time constant of a corresponding bypass switch 114 is not exceeded.

As discussed above, at the conclusion of the duration of the first delay, the controller 116 may identify a second UPS. Responsive to identifying the second UPS, the controller 116 provides a control signal to the bypass switch 114 of the second UPS to interrupt the input current through the respective bypass circuit 108 for the duration of a second delay. In particular, the controller 116 is configured to operate the bypass switch 114 of the second UPS such that the duration of the first delay and the duration of the second delay are non-concurrent.

Similar to those processes discussed above with reference to the first UPS, the controller 116 may operate the bypass switch 114 of the second UPS to interrupt the input current such that each of the UPSs 102*a-c* provides a substantially balanced output current, among the UPSs 102*a-c*, to the load 112. That is, the controller 116 is configured to operate the bypass switch 114 of the second UPS such that the power provided to the load 112 is evenly distributed among each of the UPSs 102*a-c*. Similar operations may be performed continuously and automatically by the controller 116 for a third UPS, a fourth UPS, a fifth UPS, etc. at the conclusion of the second delay period and each subsequent delay period. While discussed herein as first UPS, a second UPS, a third UPS, and etc. for the convenience of description, in various embodiments the controller 116 may operate any suitable number of UPSs, and each of the first UPS, second UPS, third UPS, and etc. may refer to the same UPS of the plurality.

Figure 1B:
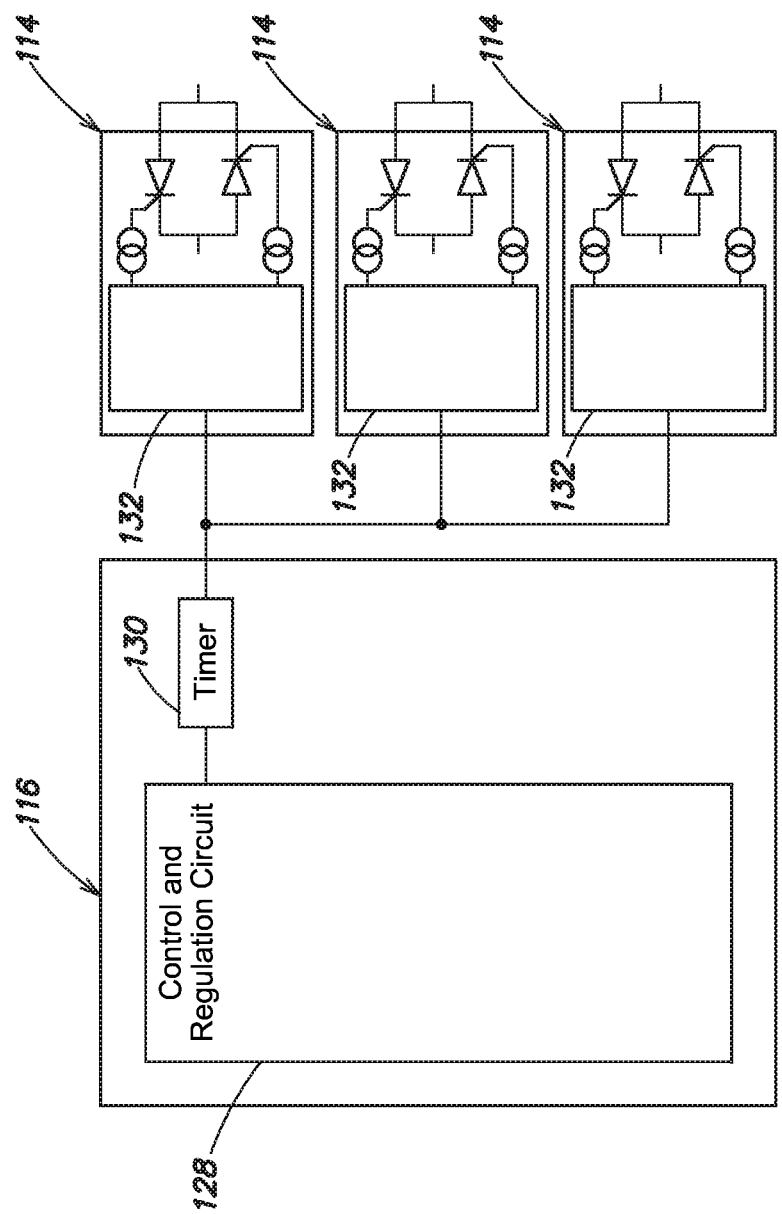
FIG. 1B is a block diagram illustrating one example of a connection between the controller and the bypass switches of the example power system illustrated in FIG. 1A, according to aspects of the invention.
Figure 1C:
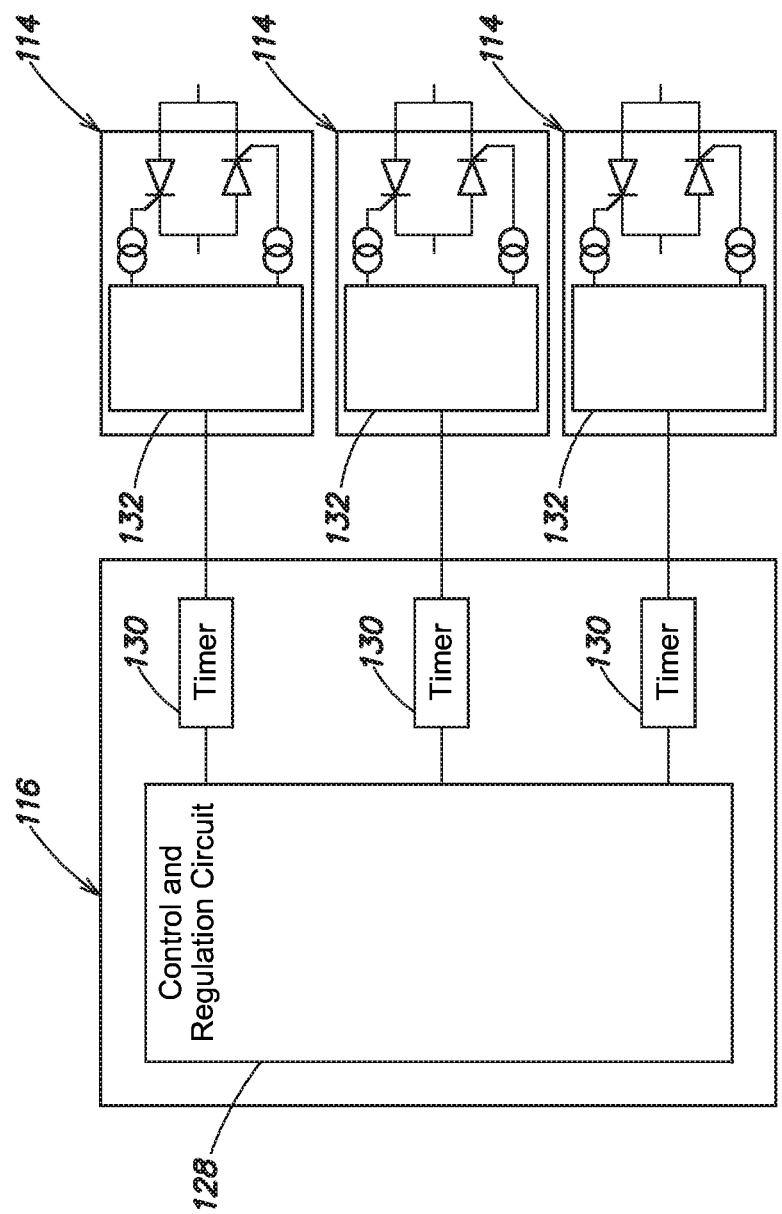
FIG. 1C is another block diagram illustrating one example of a connection between the controller and the bypass switches of the example power system illustrated in FIG. 1A, according to aspects of the invention.

According to certain examples, the input power received from the power source 110 may include single-phase electrical input power. In at least these examples, the controller 116 may be configured to provide a single control signal to the bypass switch 114 of each UPS 102*a-c*. Such an example is particularly advantageous when each bypass switch 114 includes a set of SCRs because simplified hardware and electronics may be used, reducing the complexity of the components necessary to control each bypass switch 114. FIG. 1B illustrates one simplified arrangement of the connection between the controller 116 and the bypass switches 114. FIG. 1C illustrates another simplified arrangement of the connection between the controller 116 and the bypass switches 114.

When operating multiple UPSs, such as the three UPSs 102*a*, 102*b*, 102*c* illustrated in FIG. 1A, the controller 116 may control one of the UPSs 102*a-c* to remain continuously coupled to the load 112 during the operation of system 100. That is, the controller 116 may control the bypass switches 114 of the UPSs 102*a*, 102*b* to interrupt the input current through the respective UPS while maintaining the bypass switch 114 of the UPS 102*c* in a continuously conductive state. Such an arrangement may help avoid load interruptions in some instances.

Referring to FIG. 1B, the controller 116 may include embedded hardware or software components such as a control and regulation circuit 128 and timing circuitry 130. The embedded hardware or software components of the controller 116 may interact with embedded components of the bypass switch 114 to operate each bypass switch, and in particular, each SCR within a bypass switch 114. As illustrated, in certain examples, a single control signal may operate each bypass switch 114, and in particular, all of the SCRs within each bypass switch 114. In such an example, each SCR within a bypass switch 114 may share the same embedded electronics 132, and each bypass circuit 114 may be coordinated with a single timing circuit 130. Such an example offers many of the discussed advantages over previous SCR control arrangements. For example, a typical SCR control scheme may require a dedicated timing circuit and embedded electronics for each SCR. FIG. 1C illustrates another improved, and simplified, control arrangement, according to an example. As shown in FIG. 1C, each bypass circuit 114 may receive a single control signal from a dedicated timing circuit 130.

In certain other examples, the input power may include three-phase electrical input power. In at least these examples, the bypass switch 114 of each UPS 102*a-c* may include a plurality of bypass switches, such as a bypass switch A, a bypass switch B, and a bypass switch C. Specifically, each bypass switch A-C of the plurality may correspond to a single phase of the three-phase electrical power. In one example, the controller 116 may provide a single control signal to each bypass switch A-C of the plurality to interrupt the input current through the corresponding bypass circuit 108. However, in another example, the controller 116 may provide control signals to control each bypass switch A-C of the plurality per phase, where per phase control is desired. Further, in at least another example, the controller 116 may provide a single control signal to trigger all bypass switches A-C of the plurality simultaneously to interrupt the input current through the corresponding bypass circuit 108. In still other examples, any other suitable control scheme may be used. When receiving three-phase electrical power, the power system 100 may also balance the output current among each UPS 102 per phase of the three-phase power.

Figure 2:
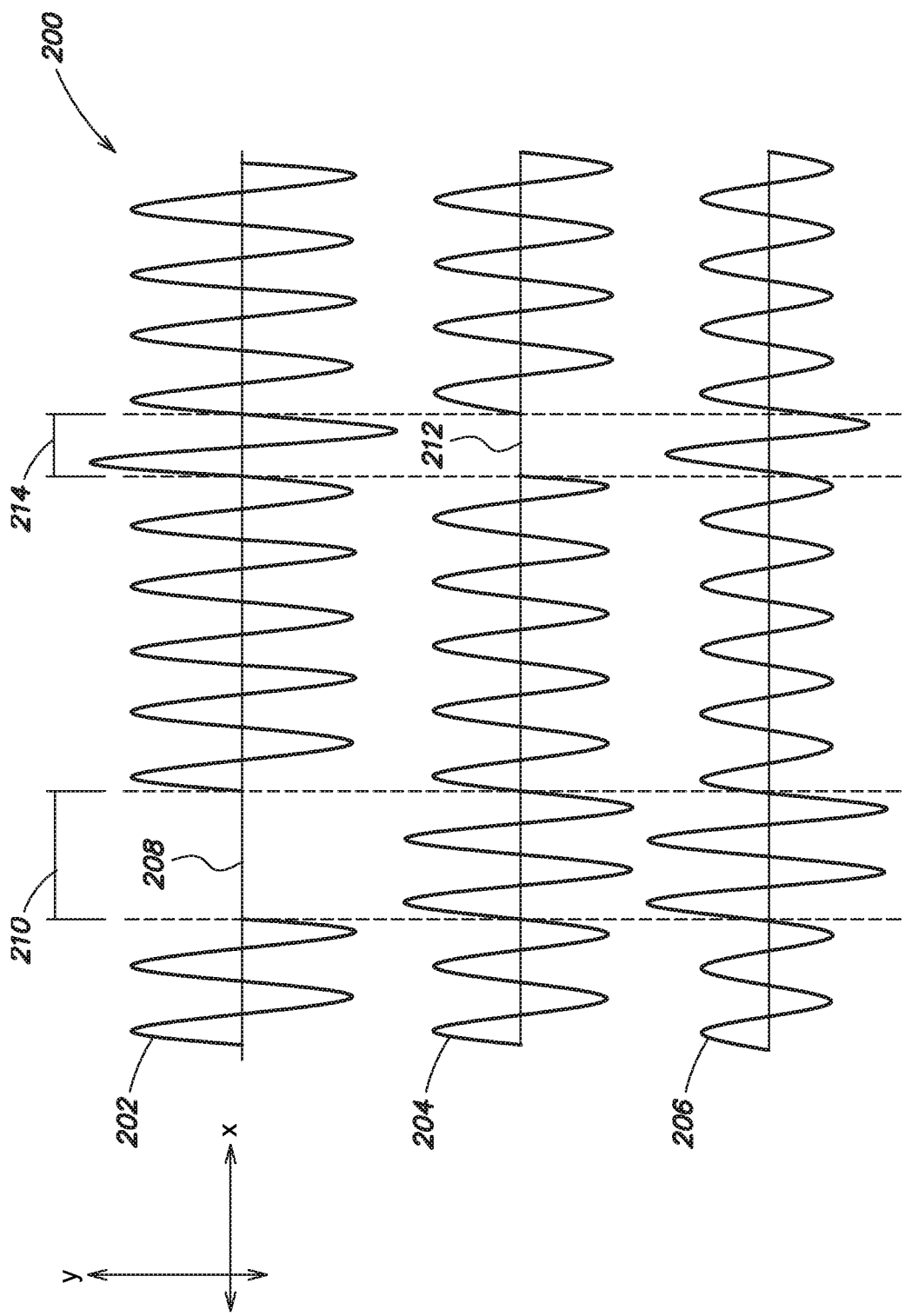
FIG. 2 is a graph illustrating the current through the bypass circuits of an example power system according to aspects of the invention.
Figure 3:
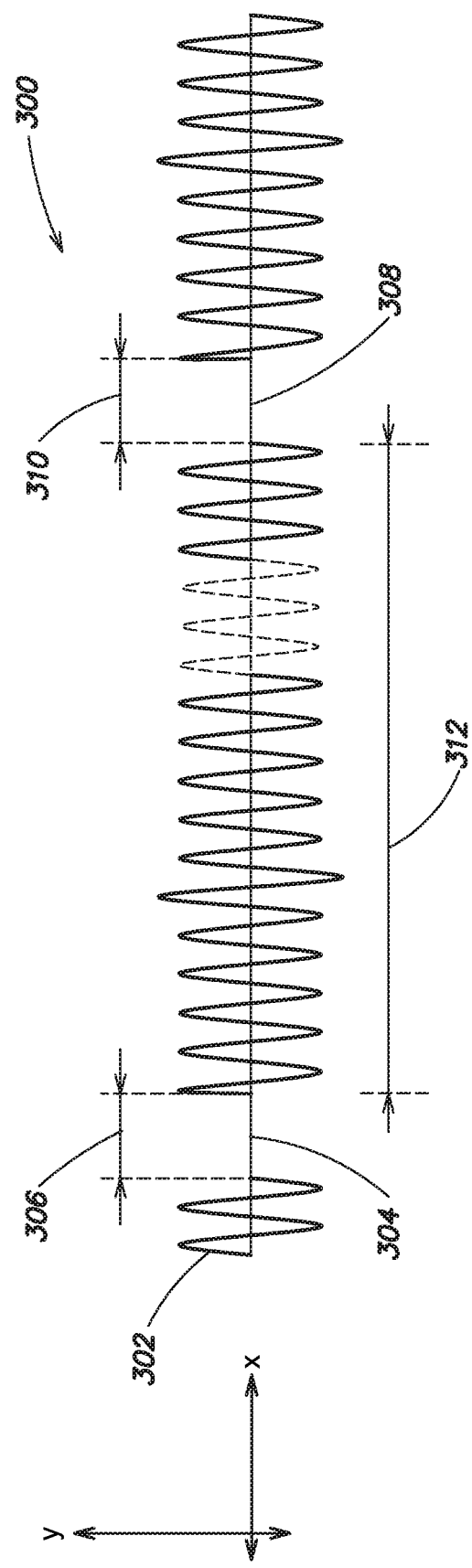
FIG. 3 is a graph illustrating the current through a bypass circuit of an example power system according to aspects of the invention.

Referring to FIG. 2, illustrated is a graph 200 of the current through the bypass circuits of each parallel UPS of an example power system according to aspects of the invention. In particular, FIG. 2 includes a first trace 202 which represents the input current through the bypass circuit 108 of UPS 102*a* during the bypass mode of operation, a second trace 204 which represents the input current through the bypass circuit 108 of UPS 102*b* during the bypass mode of operation, and a third trace 206 which represents the input current through the bypass circuit 108 of UPS 102*c* during the bypass mode of operation. In the graph 200, a value of the current is represented by the vertical axis (i.e., y-axis) and the time is represented by the horizontal axis (i.e., x-axis). FIG. 3 is a more detailed graph 300 illustrating the input current through a bypass circuit of an example UPS, such as the UPS 102*a* illustrated in FIG. 1A. FIGS. 2 and 3 are discussed with continuing reference to the example power system 100 illustrated in FIG. 1A.

As discussed with reference to FIG. 1A, in certain examples the controller 116 is configured to operate the bypass switch 114 of a first UPS to interrupt the input current through the respective bypass circuit 108 for the duration of a first delay. Referring to FIG. 2, one such interruption 208 is illustrated in the first trace 202. The duration of the first delay is represented by the first time span 210. As illustrated, in certain examples interrupting the input current through the respective bypass circuit 108 may include reducing the input current to a substantially zero value. As further illustrated, during the duration of the first delay, each of the other traces 204, 206 instantaneously increases in magnitude. Moreover, during the duration of the first delay each of the other traces 204, 206 is substantially continuous. That is, each of the other traces 204, 206 is substantially sinusoidal (e.g., when the load is linear). Accordingly, controlled and dynamic interruption of the first trace (i.e., input current of the UPS 102a) enables the system 100 to balance the power provided to the load 112, and in particular, provide a substantially equivalent RMS output current from each UPS 102a-c.

FIG. 2 further illustrates an interruption 212 in the second trace 204. As illustrated, in various embodiments, the second interruption 212 may temporally follow the first interruption 208 (e.g., the first interruption 208 and the second interruption 212 are non-concurrent). The duration of the second interruption 212 is represented by time span 214. Similar to the first interruption 208, interrupting the input current through the respective bypass circuit 108 may include reducing the input current to a substantially zero value. During the duration of the second delay, each of the other traces 202, 206 instantaneously increases in magnitude. While shown in FIG. 2 as having a shorter duration than the first delay, in various embodiments the duration of the second delay may be greater than, less than, or the same as the duration of the first delay. Specifically, the duration of the second delay may be dynamically determined by the controller 116 based at least in part on the monitored values of the input current. Accordingly, in various embodiments the second interruption 212 allows the system 100 to compensate for the interruption 208 in the first trace 202 and maintain a substantially balanced power output among the various UPSs 102a-c. That is, automatic and dynamic control of the second interruption 212 allows the system 100 to maintain a substantially equivalent RMS output current from each UPS 102a-c.

While illustrated in the example waveforms of FIG. 2 as occurring in a second trace 204, in various embodiments the controller 116 may control the same bypass switch 114 to interrupt the input current through the corresponding bypass circuit 108 for any number of desired delays. That is, the controller 116 may interrupt the input current of the first UPS for the duration of the first delay and subsequently interrupt the same input current for the duration of the second delay. FIG. 3 illustrates one such example. Referring to FIG. 3, a trace 302 represents the input current through the bypass circuit 108 of UPS 102a during the bypass mode of operation. FIG. 3 further shows a first interruption 304 in the first trace 302 and a second interruption 308 in the first trace 302. The duration of the first delay is represented by the first time span 306 and the duration of the second delay is represented by the second time span 310. While in one example, the first interruption 304 and the second interruption may occur during the same controlled time period (e.g., controlled time period 312), in certain other examples, the first and second interruptions 304, 308 may occur during different controlled time periods, as illustrated in FIG. 3.

Figure 4:
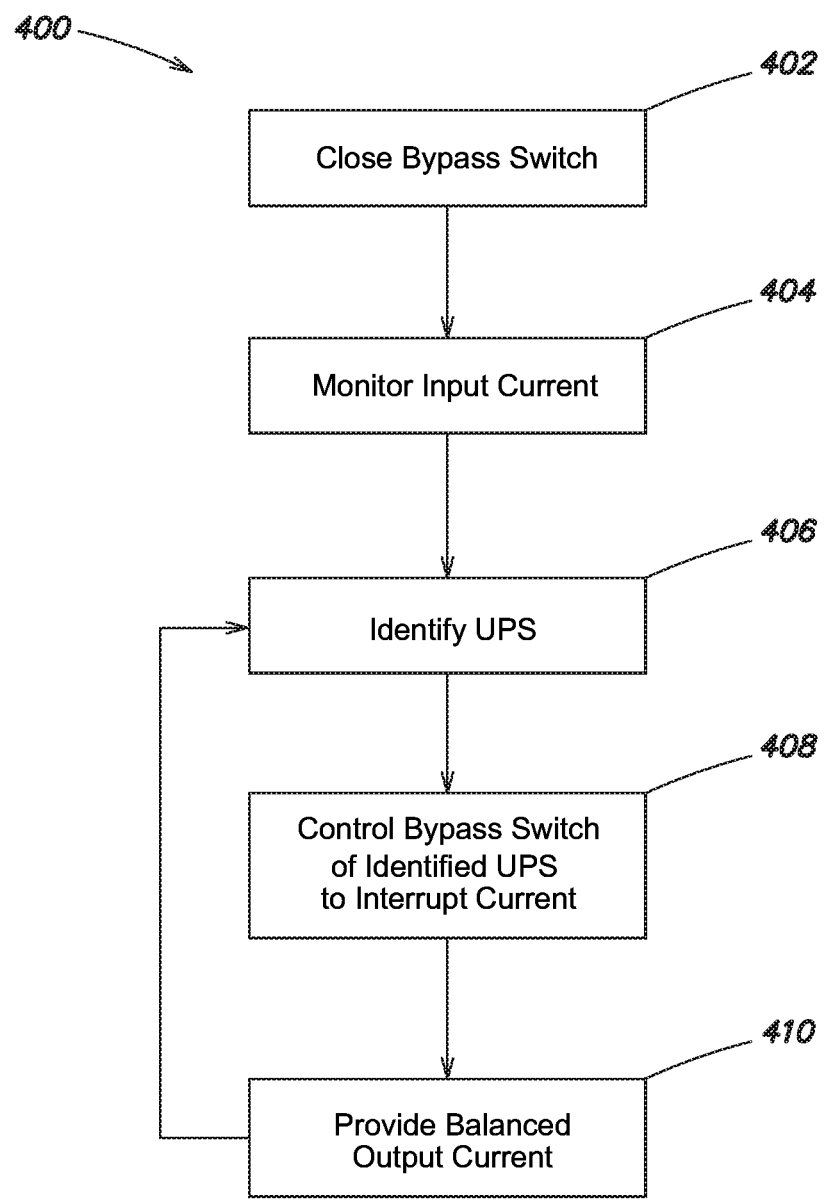
FIG. 4 is an example process flow for operating a power system including a plurality of UPSs coupled in parallel, according to aspects of the invention.

As discussed above, several aspects and embodiments perform processes for automatically balancing load sharing between each of a plurality of parallel UPSs during a bypass mode of operation. In some embodiments, these processes are executed by a power system, such as the power system 100 described above with reference to FIG. 1A. One example of such a process 400 is illustrated in FIG. 4. The illustrated process 400 is discussed with continuing reference to the example power system 100 illustrated in FIG. 1A. In certain embodiments, the process 400 may include the acts of closing the bypass switch 114 of each of the UPSs 102a-c, monitoring an input current through the bypass circuit 108 of each of the UPSs 102a-c, identifying a first UPS of the UPSs 102a-c, controlling the bypass switch 114 of the first UPS to interrupt the input current through the bypass circuit 108 thereof, and providing a balanced output current, among the UPSs 102a-c, to the load 112. It is appreciated that in various embodiments the acts 402-410 may be performed in the order discussed below. However, in various other embodiments, acts 402-410 may be performed in any other suitable order.

According to various embodiments, the process 400 may include receiving input power from a power source 110 at an input 104 of each UPS of a plurality of UPSs (e.g., UPSs 102a-c). For example, the input power may be received after the bypass switch 114 of each UPS 102a-c has been closed (act 402). In response to receiving the input power, the process 400 may include monitoring the input current through the bypass circuit 108 of each UPS 102a-c during the bypass mode of operation (act 404). In act 406, the process 400 may further include identifying a first UPS of the UPSs 102a-c based on a determination of which input current has the largest magnitude (i.e., the lowest path of impedance). In certain examples, the processes for determining which input current has the largest magnitude may include processes such as comparing each input current to the input current through each of the other bypass circuits, comparing each input current to an average, and/or any other suitable processes for identifying the UPS with the largest input current magnitude.

Once a first UPS has been identified, in act 408 the process 400 may include controlling the at least one bypass switch 114 of the first UPS to interrupt the input current through the bypass circuit 108 of the first UPS for the duration of a first delay such that each UPS 102a-c of the plurality provides a substantially balanced output current, among the UPSs 102a-c, to the load 112. For example, in act 408 the controller 116 may provide one or more control signals (e.g., signals 126) to the corresponding bypass switch 114 of the first UPS to open the bypass switch 114. In particular, the process 400 may include operating the bypass switch 114 of the first UPS to interrupt the input current such that the power provided to the load 112 is evenly distributed among each of the UPSs 102a-c. Accordingly, act 410 may include providing an evenly distributed power from each UPS 102a-c to the load.

In various examples, controlling the at least one bypass switch 114 of the first UPS may include reducing the input current through the bypass circuit 108 of the first UPS such that each UPS 102a-c of the plurality provides a substantially equivalent Root Mean Square (RMS) current to the load 112. Moreover, during the duration of the first delay, the process 400 may include providing a control signal to each of the other UPSs (i.e., all of the UPSs excluding the first UPS) to maintain the respective bypass switch 114 in a closed position such that an output current waveform of each of the other UPSs is continuous during the duration of the first delay. That is, even though an interruption is introduced in the output current of the first UPS, the load 112 receives a full sinusoidal waveform from each of the other UPSs during the duration of the first delay. Responsive to providing the balanced output power to the load 112, the process 400 may return to act 406.

While not explicitly illustrated or described with reference to FIG. 4 for the convenience of description, the example process 400 illustrated therein may include further acts and processes. Examples of these additional acts and processes are described with reference to the example power system illustrated in FIG. 1A.

Figure 5:
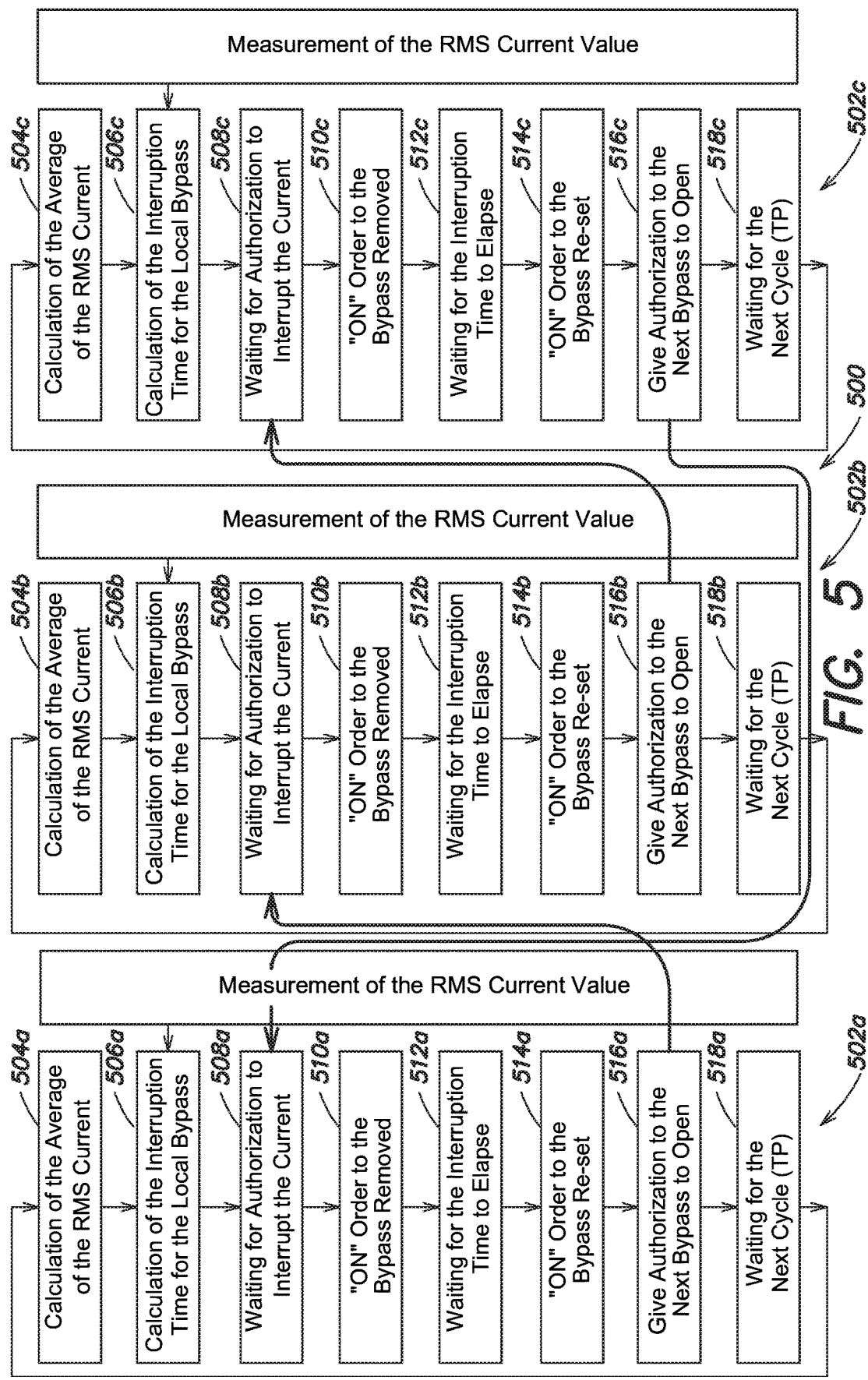
FIG. 5 is another example process flow for operating a power system including a plurality of UPSs coupled in parallel, according to aspects of the invention.

FIG. 5 illustrates another example process flow 500 for operating a power system including a plurality of UPSs coupled in parallel. In particular, FIG. 5 illustrates the interoperation of sub-processes 502a, 502b, 502c as executed by a first UPS, a second UPS, and a third UPS, respectively. In some embodiments, the process 500 is executed by a power system, such as the power system 100 described above with reference to FIG. 1A. Accordingly, the illustrated process 500 is discussed with continuing reference to the example power system 100 illustrated in FIG. 1A. While illustrated in FIG. 5 as including a first sub-process 502a executed by a first UPS (e.g., UPS 102a), a second sub-process 502b executed by a second UPS (e.g., UPS 102b), and a third sub-process 502c executed by a third UPS (e.g., UPS 102c), in certain other examples the number of sub-processes may correspond to the number of UPSs 102 within the system 100. That is, in certain examples the process 500 may include more, or less, than three sub-processes.

Each sub-process 502a-c may be performed by the corresponding UPS 102a-c, or by the controller 116. In certain examples, sub-process 502a may include the acts of calculating an RMS current (act 504a), calculating a duration of a first delay (act 506a), waiting for authorization to interrupt the input current for the duration of the first delay (act 508a), receiving a control signal to interrupt the input current (e.g., "ON order removed") (act 510a), waiting for a conclusion of the duration of the delay (act 512a), receiving a control signal to close the respective bypass switch to end the interruption (e.g., "ON order set") (act 514a), transmitting an authorization to interrupt the input current at another UPS (act 516a), and waiting for a subsequent cycle of operation (act 518a). Each of sub-processes 502b and 502c may include similar acts, as further illustrated in FIG. 5.

In certain examples, each sub-process 502a-c may operate simultaneously during the operation of the power system 100. Accordingly, in certain examples the operation of each UPS 102a-c may be interrelated. For example, the transmitted authorization of the first UPS 102a (act 516a) may act as the authorization required to prompt interruption of the input current at the second UPS 102b (act 508b). Similarly, the transmitted authorization of the second UPS 102b (act 516b) may act as the authorization required to prompt interruption of the input current at the third UPS 102c (act 508c). The transmitted authorization of the third UPS 102c (act 516c) may act as the authorization required to prompt interruption of the input current at the first UPS 102a (act 508a). Such an example may be particularly advantageous when each UPS 102a-c includes a dedicated controller 116, as discussed above.

Figure 6:
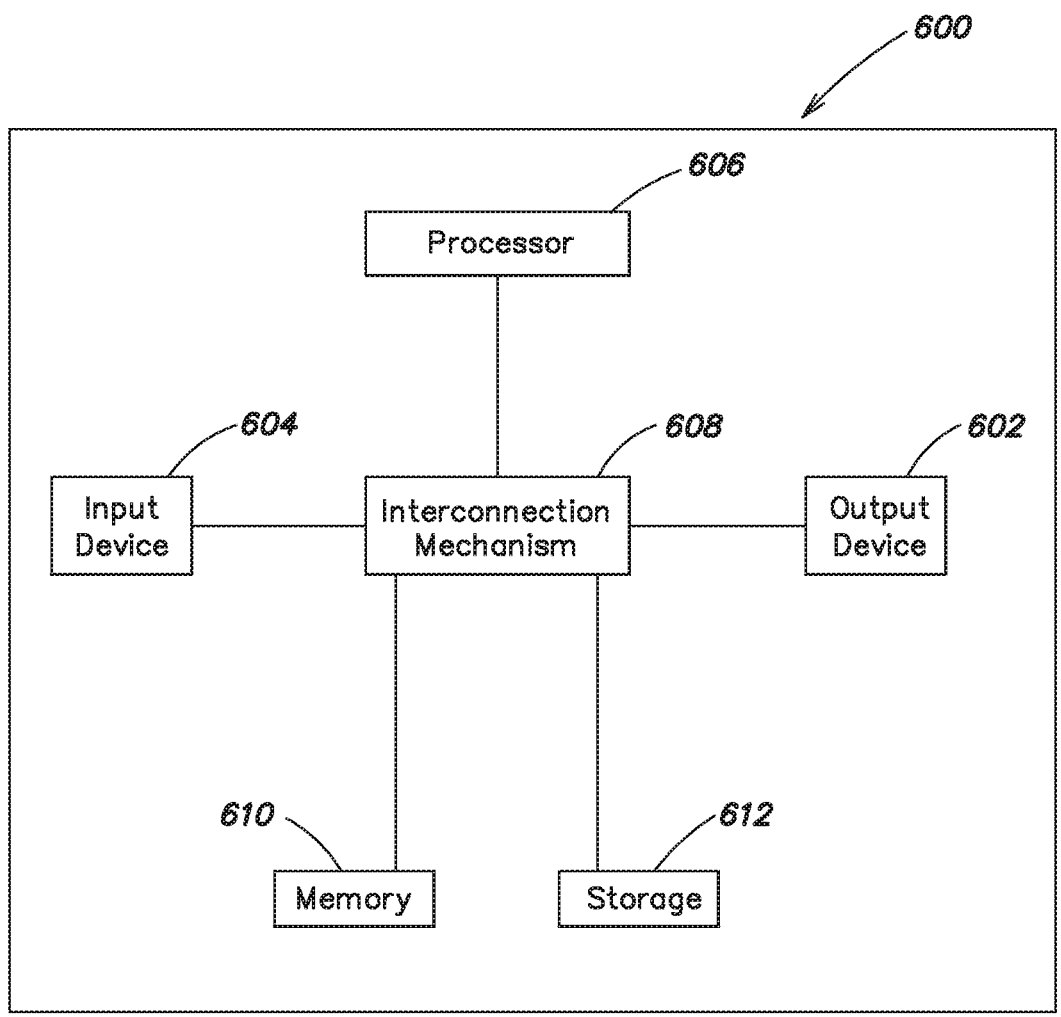
FIG. 6 is an example system upon which various examples of the embodiments may be implemented.

FIG. 6 illustrates an example block diagram of computing components forming a system 600 which may be configured to implement one or more aspects disclosed herein. For example, the system 600 may be communicatively coupled to the controller 116, included within the controller 116, or included within a UPS dedicated controller. The system 600 may also be configured operate multiple UPSs in parallel as discussed above.

The system 600 may include for example a computing platform such as those based on Intel PENTIUM-type processor, Motorola PowerPC, Sun UltraSPARC, Texas Instruments-DSP, Hewlett-Packard PA-RISC processors, or any other type of processor. System 600 may include specially-programmed, special-purpose hardware, for example, an application-specific integrated circuit (ASIC). Various aspects of the present disclosure may be implemented as specialized software executing on the system 600 such as that shown in FIG. 6.

The system 600 may include a processor/ASIC 606 connected to one or more memory devices 610, such as a disk drive, memory, flash memory or other device for storing data. Memory 610 may be used for storing programs and data during operation of the system 600. Components of the system 600 may be coupled by an interconnection mechanism 608, which may include one or more buses (e.g., between components that are integrated within a same machine) and/or a network (e.g., between components that reside on separate machines). The interconnection mechanism 608 enables communications (e.g., data, instructions) to be exchanged between components of the system 600. The system 600 also includes one or more input devices 604, which may include for example, a keyboard or a touch screen. The system 600 includes one or more output devices 602, which may include, for example, a display. In addition, the system 600 may contain one or more interfaces (not shown) that may connect the system 600 to a communication network, in addition or as an alternative to the interconnection mechanism 608.

The system 600 may include a storage system 612, which may include a computer readable and/or writeable nonvolatile medium in which signals may be stored to provide a program to be executed by the processor or to provide information stored on or in the medium to be processed by the program. The medium may, for example, be a disk or flash memory and in some examples may include RAM or other non-volatile memory such as EEPROM. In some embodiments, the processor may cause data to be read from the nonvolatile medium into another memory 610 that allows for faster access to the information by the processor/ASIC than does the medium. This memory 610 may be a volatile, random access memory such as a dynamic random access memory (DRAM) or static memory (SRAM). It may be located in storage system 612 or in memory system 610. The processor 606 may manipulate the data within the integrated circuit memory 610 and then copy the data to the storage 612 after processing is completed. A variety of mechanisms are known for managing data movement between storage 612 and the integrated circuit memory element 610, and the disclosure is not limited thereto. The disclosure is not limited to a particular memory system 610 or a storage system 612.

The system 600 may include a computer platform that is programmable using a high-level computer programming language. The system 600 may be also implemented using specially programmed, special purpose hardware, e.g. an ASIC. The system 600 may include a processor 606, which may be a commercially available processor such as the well-known Pentium class processor available from the Intel Corporation. Many other processors are available. The processor 606 may execute an operating system which may be, for example, a Windows operating system available from the Microsoft Corporation, MAC OS System X available from Apple Computer, the Solaris Operating System available from Sun Microsystems, or UNIX and/or LINUX available from various sources. Many other operating systems may be used.

The processor and operating system together may form a computer platform for which application programs in high-level programming languages may be written. It should be understood that the disclosure is not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

Accordingly, aspects and embodiments are generally directed to systems and methods for automatically balancing load sharing between each of a plurality of parallel UPSs during a bypass mode of operation. The described aspects and embodiments do not require cable length adjustments or the addition of expensive and complicated chokes to balance load sharing. By interrupting the input current through the bypass circuit of a first UPS for the duration of a first delay, and dynamically adjusting the duration of the first delay period, an RMS current of each UPS of the plurality can be controlled to provide a substantially equivalent RMS current to the load, despite differences in components and cabling. As the output current of each UPS is set to substantially the same output current value, the deviation between load sharing portions of each UPS is relatively low. Accordingly, more than four UPSs can be successfully coupled together in parallel while reducing many of the risks associated with performing load sharing between multiple UPSs coupled in parallel. While the systems and methods for providing equal load sharing discussed above are utilized with a parallel UPS system including on-line UPSs, in certain other examples, the systems and methods may be utilized with other types of UPSs or power systems.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A power system comprising:
a first Uninterruptible Power Supply (UPS) configured to operate in parallel with a plurality of UPSs, the first UPS including:
an input configured to be coupled to a power source and configured to receive input power from the power source;
an output configured to be coupled to a load and configured to provide output power to the load based at least in part on the input power;
a first bypass circuit interposed between the input and the output and including at least a first bypass switch, the at least a first bypass switch being positioned to couple the input and the output in a bypass mode of operation and decouple the input and the output in an on-line mode of operation; and
a controller coupled to at least the first UPS and configured to:

monitor a current through the first bypass circuit of the first UPS during the bypass mode of operation;
receive an input signal; and
based on the input signal, control the at least one first bypass switch of the first UPS to interrupt the current through the first bypass circuit of the first UPS for the duration of a first delay during the bypass mode of operation,
wherein in controlling the at least one first bypass switch of the first UPS to interrupt the current through the first bypass circuit the controller is further configured to determine the duration of the first delay to control a RMS current value of the current to a predetermined value.

2. The power system according to claim 1, further comprising:
the plurality of UPSs, wherein each UPS of the plurality of UPS's includes a bypass circuit including at least a bypass switch, and
wherein the controller is further coupled to each UPS of the plurality of UPS's and configured to control the bypass switch of each UPS of the plurality of UPS's during the duration of the first delay such that an output current waveform of each UPS of the plurality of UPS's is continuous.

3. The power system according to claim 2, wherein the controller is further configured to:
identify a second UPS of the plurality of UPSs and
control the bypass switch of the second UPS to interrupt the current through the bypass circuit of the second UPS for the duration of a second delay to control a RMS current value of current the bypass switch of the second UPS to the predetermined value.

4. The power system according to claim 3, wherein the controller is further configured to control the at least a first bypass switch of the first UPS and the bypass switch of the second UPS such that the duration of the first delay and the duration of the second delay are non-concurrent.

5. The power system according to claim 4, wherein in controlling the at least a first bypass switch of the first UPS to interrupt the input current through the bypass circuit of the first UPS the controller is further configured to interrupt the current through the at least a first bypass circuit of the first UPS for a duration of up to at least a full cycle of a waveform of the current through the first bypass circuit.

6. The power system according to claim 1, wherein the controller is further configured to dynamically adjust the duration of the first delay based at least in part on a value of the current through the first bypass circuit of the first UPS.

7. The power system according to claim 1, wherein the at least a first bypass switch of the first UPS includes a set of Silicon Controlled Rectifiers (SCRs).

8. The power system according to claim 7, wherein the input power includes single-phase electrical input power, and wherein in controlling the at least a first bypass switch of the first UPS to interrupt the current through the first bypass circuit of the first UPS the controller is configured to provide a single control signal to the SCRs of the first UPS.

9. The power system according to claim 1, wherein the input power includes three-phase electrical input power and the at least a first bypass switch of the first UPS includes a plurality of sets of SCRs, each set of SCRs of the plurality corresponding to a phase of the three-phase electrical input power.

10. The power system according to claim 9, wherein in controlling the at least a first bypass switch of the first UPS to interrupt the current through the first bypass circuit of the first UPS the controller is configured to provide a single control signal to each set of SCRs of the first UPS.

11. The power system according to claim 1, wherein the first UPS further includes:
an AC/DC converter coupled to the input and configured to convert the input power into DC power during the on-line mode of operation;
a DC/AC converter coupled to the output and configured to convert the DC power into the output power; and
a DC bus interposed between the AC/DC converter and the DC/AC converter,
wherein responsive to a determination that the input power is above or below a predetermined level the controller is further configured to control the at least a first bypass switch of the first UPS to operate in the on-line mode of operation.

12. A method for operating a power system including a plurality of Uninterruptible Power Supplies (UPS) coupled in parallel, the method comprising:
receiving input power from a power source at an input of each UPS of the plurality of UPS's;
monitoring a current through a bypass circuit of each UPS of the plurality during a bypass mode of operation, each bypass circuit of each of the plurality of UPS's including at least one bypass switch positioned to couple the input with an output of each UPS during the bypass mode of operation; and
controlling the at least one bypass switch of a first UPS of the plurality of UPSs to interrupt the current through the bypass circuit of the first UPS for the duration of a first delay during the bypass mode of operation,
wherein controlling the at least one bypass switch of the first UPS to interrupt the current through the bypass circuit of the first UPS includes determining the duration of the first delay to control a RMS current value of the current through the bypass circuit of the first UPS to a predetermined value.

13. The method according to claim 12, further comprising controlling the at least one bypass switch of a second UPS of the plurality of UPSs during the duration of the first delay such that an output current waveform of the second UPS is continuous.

14. The method according to claim 13, further comprising:
controlling the at least one bypass switch of the second UPS to interrupt the current through the bypass circuit of the second UPS for the duration of a second delay during the bypass mode of operation to control a RMS current value of current through the bypass circuit of the second UPS to the predetermined value.

15. The method according to claim 14, wherein controlling the at least one bypass switch of the first UPS to interrupt the current through the bypass circuit of the first UPS further includes interrupting the current through the bypass circuit of the first UPS for a duration of up to at least a full cycle of a waveform of the current through the bypass circuit of the first UPS.

16. The method according to claim 12, wherein the input power includes single-phase electrical input power and controlling the at least one bypass switch of the first UPS to interrupt the input current through the bypass circuit of the first UPS includes providing a single control signal to a set of Silicon Controlled Rectifiers (SCRs) of the first UPS.

17. The method according to claim 12, wherein the input power includes three-phase electrical input power and controlling the at least one bypass switch of the first UPS to interrupt the current through the bypass circuit of the first UPS includes providing a single control signal to a plurality of sets of Silicon Controlled Rectifiers (SCRs) of the first UPS, each set of SCRs of the plurality corresponding to a phase of the three-phase electrical input power.

18. A power system comprising:
a plurality of Uninterruptible Power Supplies (UPS), each UPS of the plurality coupled in parallel and including:
an input configured to be coupled to a power source and configured to receive input power from the power source;
an output configured to be coupled to a load and configured to provide output power to the load based at least in part on the input power;
a bypass circuit interposed between the input and the output and including at least one bypass switch, the at least one bypass switch being positioned to couple the input and the output in a bypass mode of operation and decouple the input and the output in an on-line mode of operation; and
means for controlling the at least one bypass switch of a first UPS of the plurality of UPSs to interrupt a current through the bypass circuit of the first UPS for the duration of a first delay during the bypass mode of operation,
wherein the means for controlling the at least one bypass switch of the first UPS to interrupt the current through the bypass circuit of the first UPS includes means for determining the duration of the first delay to control a RMS current value of the current through the bypass circuit of the first UPS to a predetermined value.

* * * * *